US009626394B2

United States Patent
Schmidt et al.

(10) Patent No.: US 9,626,394 B2
(45) Date of Patent: Apr. 18, 2017

(54) METHOD FOR MASS-DELETING DATA RECORDS OF A DATABASE SYSTEM

(75) Inventors: Andreas Schmidt, Großostheim (DE); Harald Schöning, Dieburg (DE)

(73) Assignee: SOFTWARE AG, Darmstadt (DE)

( * ) Notice: Subject to any disclaimer, the term of this patent is extended or adjusted under 35 U.S.C. 154(b) by 735 days.

(21) Appl. No.: 12/659,817

(22) Filed: Mar. 22, 2010

(65) Prior Publication Data

US 2011/0071986 A1    Mar. 24, 2011

(30) Foreign Application Priority Data

Sep. 18, 2009 (EP) .................................... 09170678

(51) Int. Cl.
*G06F 17/30* (2006.01)
(52) U.S. Cl.
CPC .. *G06F 17/30306* (2013.01); *G06F 17/30368* (2013.01); *G06F 17/30371* (2013.01)
(58) Field of Classification Search
CPC ......... G06F 17/30306; G06F 17/30368; G06F 17/30371
USPC ................................ 707/662, 663, 664, 684
See application file for complete search history.

(56) References Cited

U.S. PATENT DOCUMENTS

| 5,832,508 | A * | 11/1998 | Sherman et al. | |
|---|---|---|---|---|
| 7,502,972 | B1 * | 3/2009 | Chilukuri et al. | 714/45 |
| 8,156,083 | B2 * | 4/2012 | Banerjee et al. | 707/684 |
| 8,352,448 | B2 * | 1/2013 | Haye et al. | 707/703 |
| 2006/0074956 | A1 * | 4/2006 | Marwah | 707/101 |
| 2006/0235887 | A1 * | 10/2006 | Abe et al. | 707/104.1 |
| 2007/0288529 | A1 * | 12/2007 | Ganesh et al. | 707/202 |
| 2008/0243966 | A1 * | 10/2008 | Croisettier et al. | 707/206 |

OTHER PUBLICATIONS

"Deleting Lots of Data", Randy Cunningham, SageLogix Inc., Nov. 15, 2008.
"Optimize the Massive Delete Operation in Oracle, Part 2", Boris Milrud; devx.com.
"Oracle Delete Performance Tips", Donald Burleson; dbaoracle.com.
"Efficient Bulk Deletes in Relational Databases", Gärtner et al., IEEE 2001, pp. 183-192.
"Truncate (SQL)" www.wikipedia.org/article/truncate(SQL), Date Unknown.
"What Is the Use of Truncate Command?" http://Sawaal.ibibo.com/computers-and-technology/what-use-truncate-command-608470.html, Dec. 12, 2008.

* cited by examiner

*Primary Examiner* — Rehana Perveen
*Assistant Examiner* — Hicham Skhoun
(74) *Attorney, Agent, or Firm* — Nixon & Vanderhye P.C.

(57) ABSTRACT

A method for mass-deleting a plurality of data records from a database system includes creating a data structure that includes an identifier of each of the plurality of data records to be deleted and inserting a pointer to the data structure into a transaction log of the database system.

24 Claims, 5 Drawing Sheets

METHOD FOR MASS-DELETING DATA RECORDS OF A DATABASE SYSTEM

This application claims priority to European Application No. 09170678.8, filed 18 Sep. 2009, the entire contents of which is hereby incorporated by reference.

1. TECHNICAL FIELD

The present invention relates to a method for mass-deleting data records of a database system.

2. THE PRIOR ART

In modern computing environments, database systems are commonly used for storing, retrieving and managing large amounts of data. A database system typically comprises at least one database for storing the data, wherein the data is structured in individual data records that may be distributed among different partitions/tables of the at least one database. In order to query and/or modify the data, database systems typically process respective database requests as so-called database transactions. A transaction may in this context comprise one or more individual steps to be performed on the data of the database and typically follows the well-known ACID properties. A database system may further comprise a transaction log(also called a redo log) that logs each transaction performed within the system. Such redo logs may be used for a variety of tasks, such as rolling-back (undoing) an already performed (committed) transaction, backing-out (aborting) an ongoing transaction, redoing a rolled-back or aborted transaction or replicating the data to a backup database.

In order to keep the data of a database system up to date, it is oftentimes necessary to remove old and outdated data records, e.g. for cleaning up historical data within one or more live, i.e. active, database partitions/tables. This often involves the deletion of a vast amount of data records, e.g. in a batch-like process, which is called "mass delete".

In the prior art, it is known to process a mass delete as a so-called transactional mass delete, i.e. each data record to be deleted is removed from the database within an individual transaction. This has the advantage that each single data record deletion is recorded in the transaction log and can therefore be tracked individually afterwards. However, transactional mass deletes produce a huge amount of transaction log data, which is extremely inefficient, since the database processing is considerably slowed down. The efficiency is even further decreased due to the huge amount of indexes on the data that have to be updated. More importantly, due to the large amount of storage space needed for the transaction log data, this approach involves the risk of an memory overflow in the transaction log, which may result in a transaction timeout or in the worst case in a complete crash of the entire database system.

Another known approach is a so-called non-transactional mass delete. Here, internal interfaces of the database are used that do not create transaction log entries, thereby resulting in a faster processing of the mass delete. However, the data partitions/tables affected by the mass delete process are typically not accessible for processes other than the mass delete process due to the internal database modifications in progress. More importantly, if a non-transactional mass delete fails, e.g. due to a power outage or a crash of the database during the mass delete process, the database remains in a corrupted state since there is no information about which of the data records have already been deleted or still need to be deleted in the transaction log. Consequently, the database has to undergo laborious repair processes, e.g. by applying a backup.

It is therefore the technical problem underlying the present invention to provide an improved mass deletion method which at least partly overcomes the above explained disadvantages of the prior art.

3. SUMMARY OF THE INVENTION

This problem is according to one aspect of the invention solved by a method for mass deleting a plurality of data records from a database system. In the embodiment of claim 1, the method comprises the following step performed during a processing of a mass delete request:

a. creating a data structure comprising an identifier of each of the plurality of data records to be deleted and inserting a pointer to the data structure into a transaction log of the database system.

Accordingly, the mass delete method according to the above embodiment departs from the known transactional mass delete approach in that it does not produce a single transaction log entry for each individual data record to be deleted. Instead, an identifier of each of the plurality of data records to be deleted is obtained and collected in a data structure. Only a pointer to this data structure is then inserted into the transaction log of the database system, which requires by far less processing time. Moreover, since the mass delete process produces much less transaction log data as compared to the known transactional mass delete approach, the risk of a transaction log overflow is effectively excluded, thereby improving the availability and reliability of the database system. Lastly, the embodiment is also advantageous over the known non-transactional mass delete approach, since the transaction log of the invention still provides all the necessary information (i.e. the identifiers of the plurality of data records to be deleted via the linked data structure) required in case of failure of the database system. In summary, the embodiment defines a mass delete that is fail-safe and at the same time much more efficient as compared to the known approaches.

The step of creating the above data structure is generally performed during a processing of a mass delete request. A mass delete request may to this end be initiated by a user or an application using the database system, internally by the database system itself or in any other suitable manner. The processing of the mass delete request, may e.g. comprise the further step of removing the plurality of data records to be deleted from the database system, preferably upon receipt of a 'commit' command, as explained in more detail further below.

In another aspect of the present invention, the plurality of data records to be deleted may be comprised in at least one partition of the database system and the method may comprise the following further steps performed if the number of data records to be deleted is less than a predetermined threshold: moving the plurality of data records to be deleted from a first area of the at least one partition to a second area of the at least one partition and, upon receipt of a 'commit command', deallocating the second area of the at least one partition. Accordingly, the data records of the database system are generally organized in one or more partitions, wherein a term 'partition' may refer to any kind of physical and/or logical structuring means, such as a database table, for organizing the data records of a database system. The at least one affected partition of the database system (i.e. the at least one partition comprising the plurality of data records to be deleted) is internally rearranged in a preparatory step, so that the actual deletion of the desired data records can be processed much more efficiently afterwards, i.e. when the mass delete processing is finally committed. More specifically, the reorganization of the at least one partition takes into account the amount of data records to be deleted. If the number of data records to be deleted is less than a given threshold, e.g. less than 50% of the total number of data records stored in the at least one partition, the data records to be deleted are collected from a first area of the at least one partition and transferred into a special allocated area (the second area) of the partition with a simple move operation. The second area of the at least one partition is preferably a newly allocated area that is empty before the move operation. The first and second areas may further refer to different physical and/or logical portions of the at least one partition, e.g. the second area may indicate the end portion of a database table. Due to the "grouping" of the data records to be deleted in the second area of the at least one partition, the second area can be simply deallocated once a 'commit' command is received. In other words, the second area is simply "cut out" of the database memory, preferably in a single step, thereby effectively removing all of the plurality of data records to be deleted at once. The 'commit' command may be received by a user, an application, the database system itself or in any other suitable manner.

Preferably, the second area of the at least one partition is visible during a processing of at least one further database request. Accordingly, since the second area comprising the data records to be deleted after the move operation is visible, the respective data records can still be accessed when processing further database request other than the mass delete request, such as e.g. database transactions for querying the data records.

In a further aspect of the present invention, the plurality of data records to be deleted may be comprised in at least one partition of the database system, the at least one partition may comprise at least one further data record to be preserved and the method may comprise the following further steps performed if the number of data records to be deleted is greater than or equal to a predetermined threshold: copying the at least one data record to be preserved from a first area of the at least one partition to a hidden third area of the at least one partition and, upon receipt of a 'commit' command, setting the hidden third area of the at least one partition to visible and deallocating the first area of the at least one partition. Accordingly, if the number of data records to be deleted exceeds a given threshold, e.g. if more than 50% of the total number of data records stored in the at least one partition are to be deleted, the at least one partition is rearranged in that the at least one data record to be preserved is copied into a hidden third area of the at least one partition. Since this third area is hidden, it cannot be accessed during a processing of further database requests other than the mass delete request. Instead, any other requests can only access the first area of the at least one partition, which still comprises the plurality of data records to be deleted and the at least one further data record to be preserved, thereby ensuring that any further requests can still operate on a consistent data set. When the mass delete process is finally committed, the first area of the at least one partition is simply deallocated and the hidden third area (comprising only the at least one data record to be preserved) is set to visible. In other words, upon receipt of a 'commit' command, the old data version of the at least one partition is seamlessly and effectively switched to the new data version, so that the new data version (comprising only the at least one data record to be preserved) is immediately visible for any requests that might occur in parallel to the mass delete.

It is noted that in case the mass delete processing is aborted, e.g. upon request or due to a power outage or a hardware crash, the data records of the at least one partition are still in a consistent state, since the first (visible) area of the at least one partition still comprises both the plurality of data records to be deleted and the at least one data record to be preserved. Consequently, there is no need to apply a laborious backup of the database after a crash. Instead the method may comprise in this aspect the further step of, upon receipt of a corresponding 'rollback' command, deallocating the hidden third area of the at least one partition.

In yet another aspect, the database system may comprise at least one existing index based on the plurality of data records to be deleted and at least one further data record to be preserved and the method may comprise the further steps of generating at least one new index based only on the at least one data record to be preserved and, upon receipt of a 'commit' command, replacing the at least one existing index with the at least one new index. Accordingly, the at least one new index is preferably completely rebuilt based on the remaining data of the at least one partition, i.e. on the at least one data record to be preserved. The at least one new index is preferably built in a location decoupled from the at least one existing index and is preferably invisible to any requests that might be processed in parallel to the mass delete transaction process. Instead any existing requests preferably operate on the at least one existing index. A rebuilt of the at least one new index is much more efficient than deleting record by record directly from the at least one existing index in a logical way, as known from the prior art. Once the method of the present invention receives the 'commit' command, the at least one existing index is simply replaced by the at least one new index.

In case the mass delete processing is aborted, e.g. upon request or due to a power outage or a hardware crash, the at least one existing index is still in a consistent state, since it has not yet been modified, before the 'commit' command. Consequently, there is no need to laboriously restore any indexes in case of failure, but the method may simply comprise in this aspect the further step of, upon receipt of a corresponding 'rollback' command, deallocating the at least one new index.

Furthermore, the method of the present invention may comprise the further steps to of locking at least one partition comprising the plurality of data records to be deleted for write access but allowing read access prior to any modification of the at least one partition and/or unlocking the at least one partition after a removing of the plurality of data records to be deleted. Accordingly, any further database requests other than the mass delete processing of the present invention may still read the data records of the at least one affected partition while a mass delete is in progress. This ensures that any requests for querying the data of the database can be processed in parallel to the mass delete, so that these requests do not experience any delays. However, the requests are preferably not allowed to modify the at least one partition while the mass delete is in progress in order to ensure the consistency of the database. The at least one partition is preferably locked directly prior to the rearrangement of the at least one partition described further above in order to keep the overall time that no modifications by other transactions are allowed to a minimum. Alternatively, the at least one partition may be locked at the beginning of the mass delete process in order to ensure that no data records are modified after the identifiers of the plurality of data records to be deleted have been collected. The unlocking of the at least one partition is preferably performed as the last step of the described method.

Preferably, the data structure created in step a. of the present method is a bitmap file. Such a bitmap file, wherein the plurality of identifiers of the data records to be deleted are flagged in a file system of the at least one partition, provides a specifically efficient implementation of the data structure, a pointer of which is inserted into the transaction log of the database system. The structure of such a bitmap file will be explained in more detail further below.

Moreover, a mass delete request may specify the plurality of data records to be deleted in a generic form such as "mass delete all data records that were created before 01.01.1990". In order to determine which of the data records of the at least one partition are affected by this request and shall be mass deleted, the method may comprise in one aspect the further step of processing at least one database query to obtain the identifiers of the plurality of data records to be deleted. Accordingly, in the above example, at least one database query is performed that queries the at least one partition and obtains the identifiers of data records that have a creation date before '01.01.1990'. Furthermore, the plurality of data records to be deleted may be distributed among a plurality of different partitions of the database system.

In yet another aspect of the present invention, the method may comprise the further step of, upon receipt of a 'redo' command, looking up the pointer to the data structure within the transaction log of the database system and performing a mass delete based on the identifiers comprised in the data structure. Accordingly, in case a given first mass delete transaction has to be redone, i.e. processed once more during a second mass delete transaction at a later stage, the entire mass delete process of the present invention may simply be repeated, wherein the second mass delete transaction may simply operate on the identifiers that have been stored by the first mass delete transaction.

The present invention also concerns a computer program comprising instructions for implementing any of the above methods. Lastly, a database system is provided adapted for performing any of the above methods.

4. SHORT DESCRIPTION OF THE DRAWINGS

In the following detailed description, presently preferred embodiments of the invention are further described with reference to the following figures.

5. DETAILED DESCRIPTION

Figure 1:
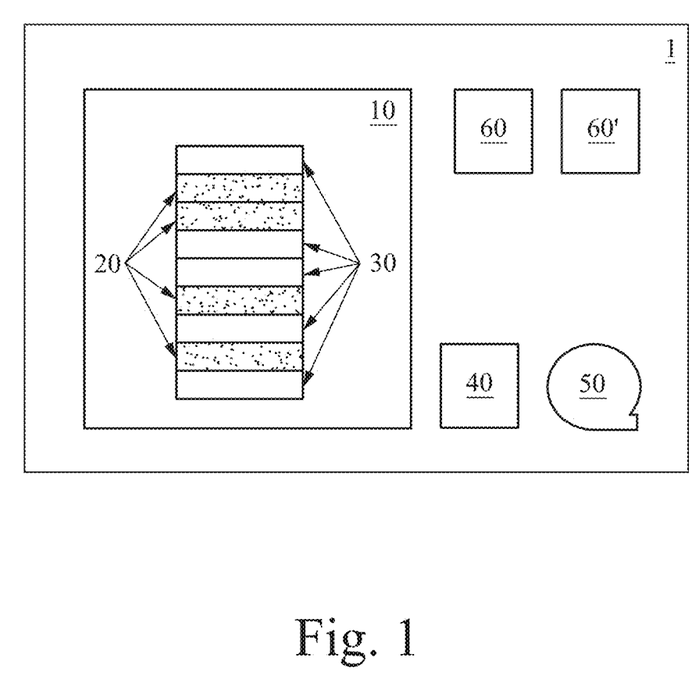
FIG. 1: A schematic overview of a database system according to an embodiment of the present invention.

In the following, a presently preferred embodiment of the invention is described with respect to a database system 1 as schematically shown in FIG. 1. As can be seen, the database system 1 comprises a partition/table 10 that comprises nine exemplary data records 20, 30. It will be appreciated that FIG. 1 is extremely simplified and that the present invention covers much more complex database systems with any number of partitions 10 with possibly millions of data records 20, 30.

The processing of a mass delete request for mass deleting the data records 20 from the database system 1 is further explained in connection with FIGS. 3 and 4. The steps depicted in FIG. 3 can be generally considered preparatory steps performed prior to the steps depicted in FIG. 4, in which the affected data records 20 are actually removed or the mass delete transaction is aborted. It will be appreciated that, while FIGS. 3 and 4 show a comprehensive embodiment of the present invention that offers a variety of advantages, the individual aspects described hereinafter may be implemented independently, thereby still providing their individual advantages.

Figure 3:
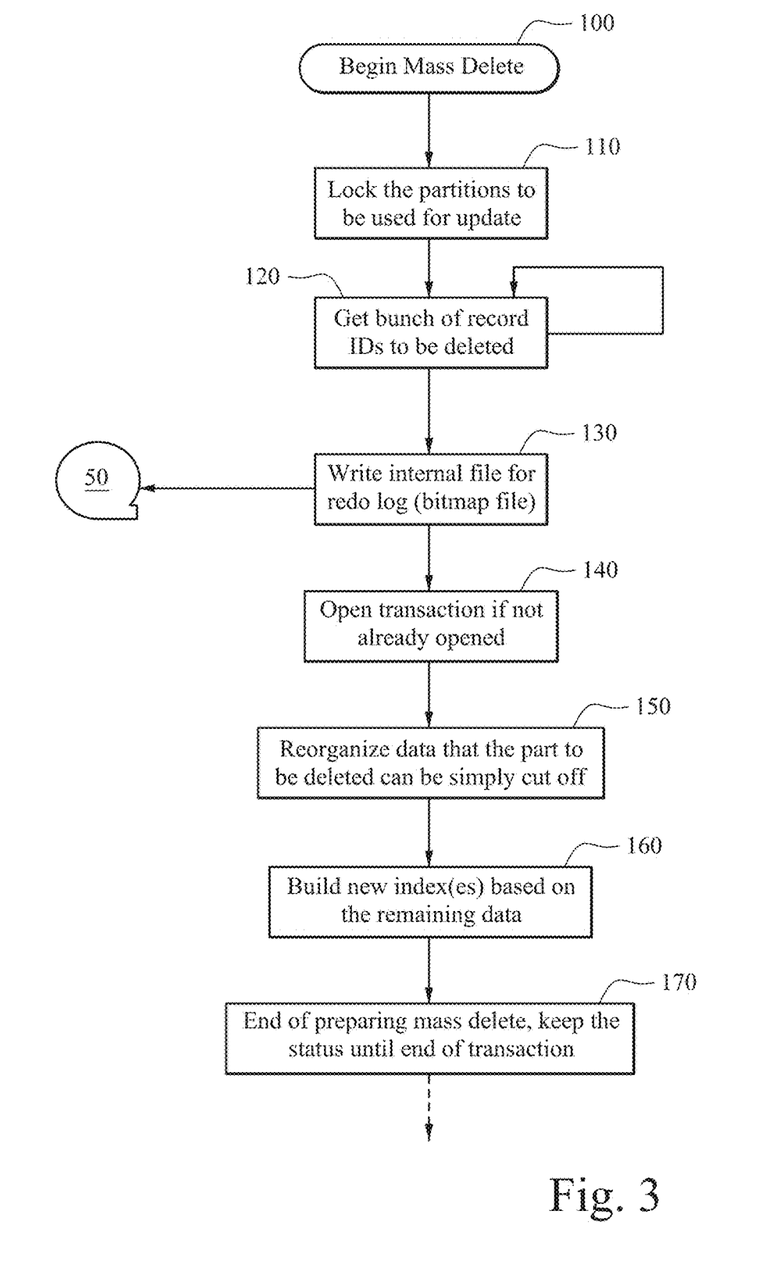
FIGS. 3, 4: Flow charts of processing steps performed during a mass delete according to an embodiment of the present invention.
Figure 4:
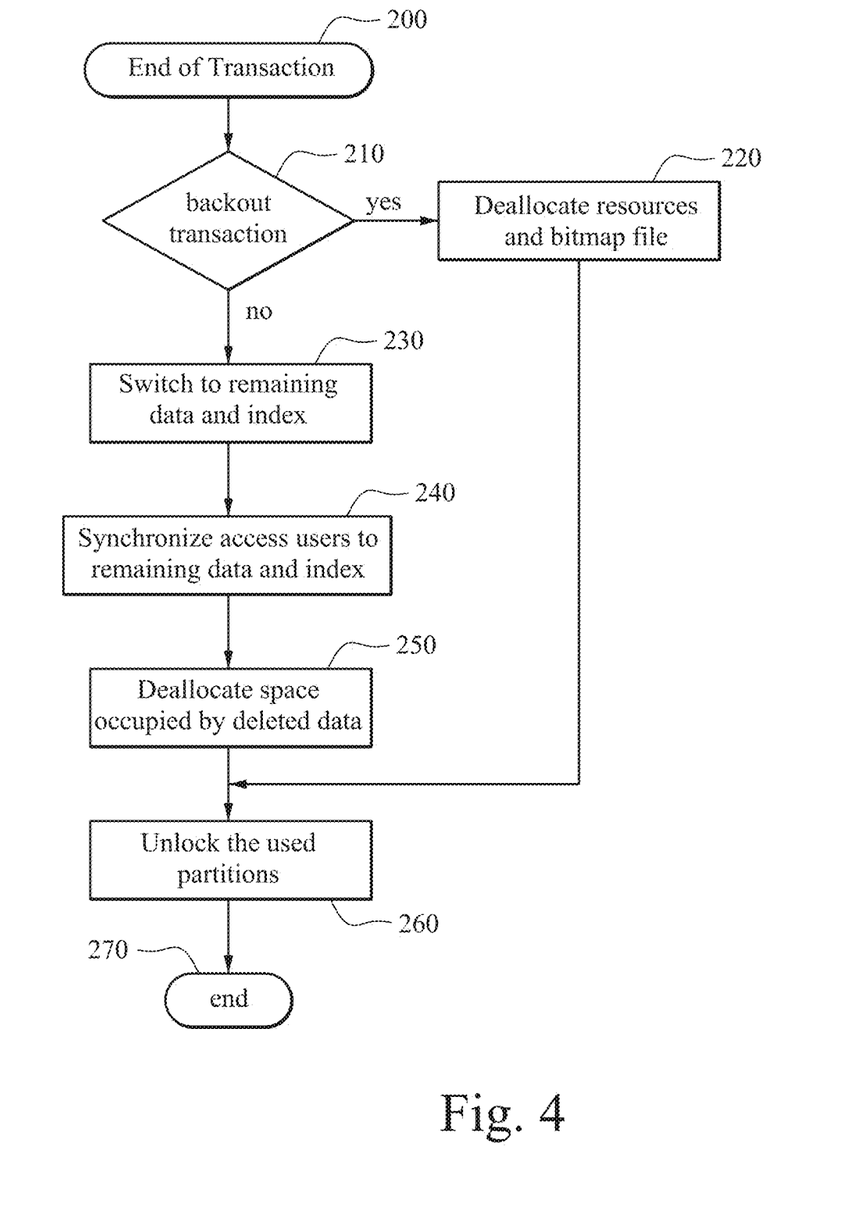

As can be seen in FIG. 3, the processing starts in step 100, preferably in response to receiving a 'begin transaction' command at the database system 1. In step 110, the partition 10 affected by the mass delete is locked for write access by any further transactions other than the mass delete transaction. However, any further transactions may still read the partition 10 while the mass delete is in progress.

In step 120, the mass delete procedure determines the data records 20 to be deleted among the data records 20, 30 of the partition 10. To this end, identifiers, such as record IDs (e.g. in the format of 4-byte unsigned integer values), of the data records 20 of the partition 10 are obtained. The determination of the data records 20 to be deleted may be achieved internally by the database system 1 (e.g. by means of one or more queries on the data records 20, 30 that may involve multiple partitions 10) and/or externally (e.g. by an external application that knows which data records are to be deleted).

The obtained record IDs are in step 130 transferred to an internal format (the data structure 40 depicted in FIG. 1) and a pointer is inserted into the transaction log 50 of the database system 1. The data structure 40 may be used for a possible redo log operation at a later stage (see further below).

An efficient way for implementing the data structure 40 is to create a bitmap file, wherein the record IDs are flagged in the file system of each partition 10. The bitmap file is preferably a sequential file starting with a header followed by a bit list. A bit in the bit list refers to a record ID and a bit that is set (i.e. a bit with value '1') may indicate a record to be deleted. The bitmap preferably starts with the first record ID to be deleted and ends with the last record ID to be deleted.

Alternatively, the data structure 40 may be implemented as an ASCII file with numbers and ranges. This format may comprise printable record ID numbers separated by comma as well as range specifications indicating a plurality of adjacent, i.e. consecutive, record IDs (e.g. "1000, 4000-5000").

For the permanent storage of the data structure 40, the present method may choose the format occupying the least disk space. If e.g. many adjacent record IDs are identified, the ASCII file with range specifications is the most efficient format, since it allows to efficiently specify record ID ranges such as "4000-5000". However if there are many arbitrarily distributed record IDs, it is more efficient to implement the data structure 40 in a bitmap file in order to save disk space.

In step 140, the mass delete transaction is opened, if it is not already open. Generally, each update command (e.g. inserting a new data record by means of an 'insert record' command) may start a database transaction. In this context, the mass delete command is treated like an update command, i.e. it also opens a transaction, which may be later finished by either a 'commit' or a 'rollback' command. If the application initiating the mass delete has already opened a transaction (e.g. with an 'insert'), the mass delete does not have to open the transaction, since it is already open.

Figure 2A:
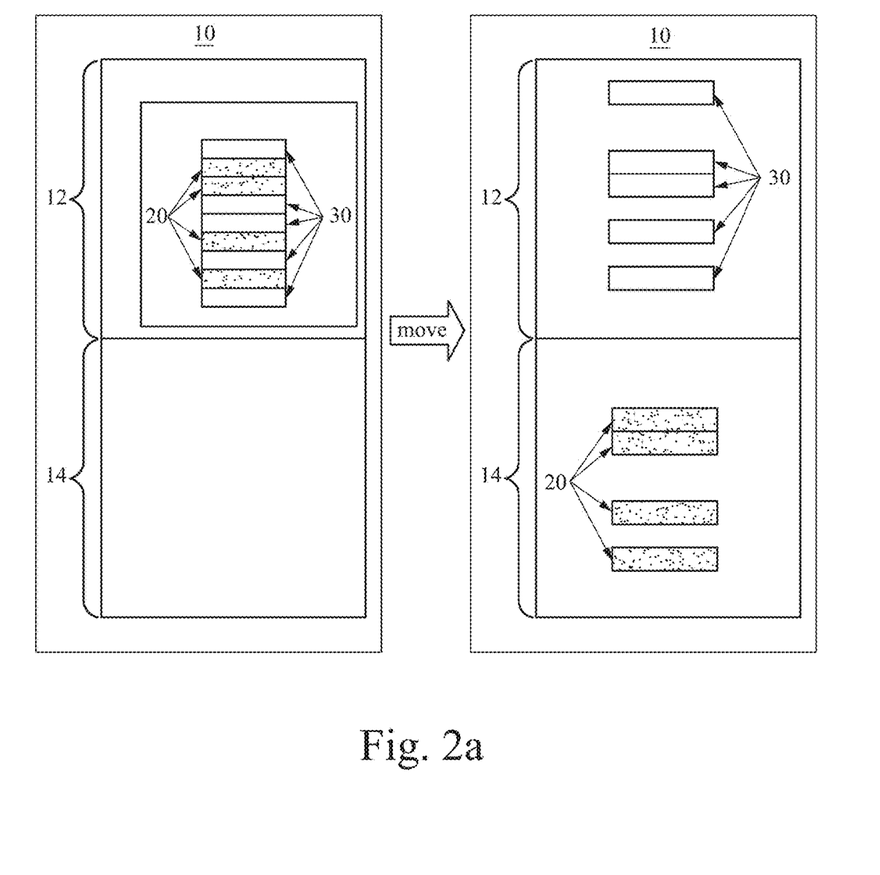
FIG. 2a, b: Schematic views of rearrangements of at least one partition of a database system according to an embodiment of the present invention.
Figure 2B:
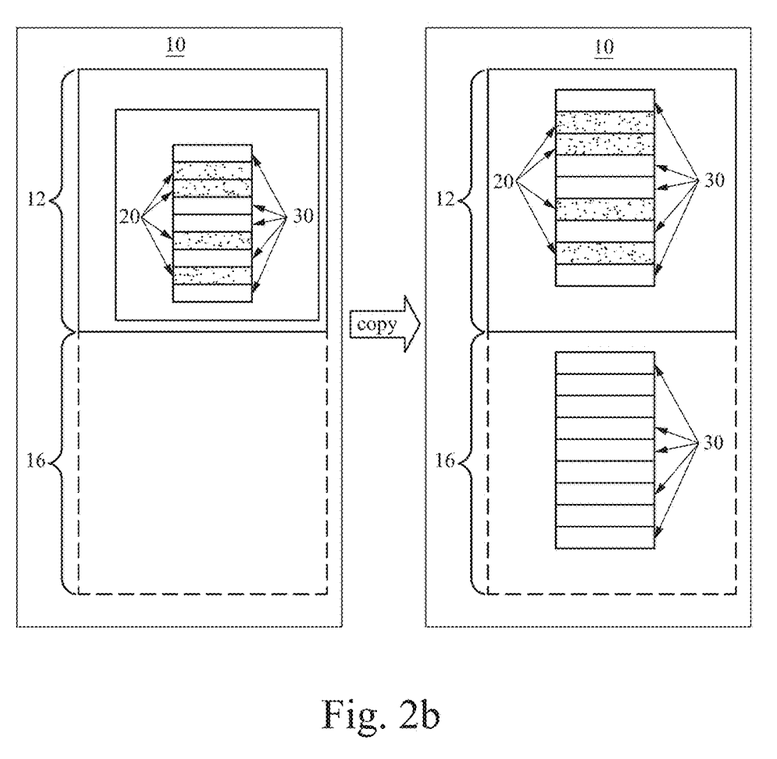

In step 150, the database system 1 internally rearranges the partition 10 (i.e. its data records 20, 30), so that a simple "cut" is sufficient to truncate the data records 20 to be deleted later at the end of the mass delete transaction. In order to optimize the rearrangement performed in step 150, it is taken into account how many data records in relation to the currently existing data records should be deleted. FIGS. 2a and 2b show in this context different handlings depending on the number of data records 20 with respect to a given threshold, wherein the left-hand side of FIGS. 2a,b shows the structure of the partition 10 before the rearrangement 150 and wherein the right-hand side of FIGS. 2a, b shows the structure of the partition 10 after the rearrangement 150.

If the number of data records 20 to be deleted is less than the threshold (e.g. if less than 50% of the data records 20, 30 are supposed to be deleted), the partition 10 is rearranged as depicted in FIG. 2a. Looking more in detail, it can be seen that before the rearrangement 150, the partition 10 comprises a first area 12 with the data records 20, 30 as well as a second area 14, which is preferably initially empty. During the rearrangement 150, the data records 20 to be deleted are transferred from the first area 12 into the second area 14 with a simple 'move' operation, while the data records 30 of the preserved stay in the first area 12 of the partition 10. The second area 14 may be simply removed, i.e. cut out of the partition 10 later during the mass delete procedure. The second area 14 is, similar to the first area 12, preferably visible to any further transactions that might occur in parallel to the mass deletion procedure, so that any further transactions may still access the data records 20, 30 at this stage.

Otherwise, if the number of data records 20 to be deleted is greater than or equal to the threshold (e.g. if more than 50% of the data records 20, 30 are supposed to be deleted), the partition 10 is rearranged as depicted in FIG. 2b. Here, the data records 30 to be preserved are transferred from the first area 12 into a third area 16 by means of a simple 'copy' operation. Accordingly, the partition 10 after the rearrangement 150 comprises in the first area 12 the original data records 20, 30 and in the third area 16 a further copy of the data records 30 to be preserved. The third area 16 is, in contrast to the first area 12, preferably hidden for any further transactions that might occur in parallel to the mass deletion procedure, so that any further transactions may only access the data records 20, 30 within the first area 12 at this stage. This ensures the data integrity in case of database crashes. The hidden third area 16 is activated later in the mass delete procedure, as will be explained further below.

As can be seen, during both kinds of rearrangements 150, the amount of data records to be moved/copied is minimized, thereby improving the efficiency of the claimed mass delete process to a great extent.

Returning to FIG. 3, one or more new indexes 60' are generated based on the data records 30 to be preserved in step 160. In contrast to the prior art, no existing indexes 60 (cf. FIG. 1) of the database system 1 are modified, but the one or more new indexes 60' are completely built in another location decoupled from the existing one or more indexes 60. Any parallel read accesses of further transactions may operate on the existing indexes 60 as well as the existing data records 20, 30. A rebuild of the remaining part of an index (i.e. the part that relates to the data records 30 to be preserved) within a new index 60' is generally more efficient than deleting record by record from an existing index 60 in a logical way.

After the above preparatory steps have been performed, the method preferably waits in step 170 for an 'end of transaction' command of the submitting session (i.e. the database context in which the mass delete transaction has been initiated). It is noted that at this point of the overall procedure, no data records have been removed so far and any further parallel transactions still operate on the original data records 20, 30 of the partition 10.

FIG. 4 shows the further processing steps performed upon receipt of an 'end of transaction' command in step 200. In step 210, it is first determined whether the mass delete transaction shall be committed or backed-out (aborted).

If the mass delete transaction is committed by the session, the method proceeds to step 230, in which the method switches to the remaining data (i.e. the data records 30 to be preserved) and the new index 60'. More specifically, the data records 20 to be removed are simply cut-off from the partition 10, so that the space occupied by the data records 20 to be deleted is deallocated in step 250. Depending on the kind of rearrangement performed in step 150 above, this is achieved by either de-allocating the second area 14 of the partition 10, or by deallocating the first area 12 while the hidden third area 16 is set to visible. In either case, all the data records 20 to be deleted are effectively removed from the partition 10 by simply deallocating some internal structures of the partition 10. Furthermore, the existing index 60 is switched to the new index 60'.

Parallel read accesses of further transactions are in step 240 smoothly transferred to the now remaining data (the data records 30 to be preserved) and the index 60, which has been replaced by the new index 60'. This is preferably achieved with a smooth pointer manipulation, so that parallel index and data accesses of further transactions will be smoothly transferred to the at least one new index and the remaining data. Consequently, the further transactions do not experience any delay. To this end, the database system may provide a lower processing layer that offers an API of native commands, such as 'read one record' or 'search records by index'. Such native commands may acquire a shared lock of a central data structure of a database table (partition) at the very beginning of the command and may return the lock at command completion. The mass-delete procedure, before switching to the new data/index, may acquire this lock in an exclusive manner, i.e. it will wait until all other native commands currently operating on the affected table/partition are completed. If the exclusive lock is acquired by the mass-delete, any newly issued native commands will be blocked until the switching by the mass-delete is finished. Since such a switching is very fast, parallel native commands do not experience any delays.

Furthermore, if the session issues a 'rollback' command in step 210, only the areas prepared further above are deallocated in step 220, i.e. the new index 60', the hidden third area 16 populated during the copy operation and/or the data structure 40.

Regardless of whether the mass delete transaction has been committed or aborted in step 210, the partition 10 is finally unlocked in step 260 and the mass delete transaction method ends in step 270.

In case of a database failure during any stage of the mass delete procedure, the data of the partition 10 is not corrupted, since the partition 10 still comprises at any point in time and regardless of the kind of rearrangement 150 performed above, both the original data records 20 to be deleted as well as the original data records 30 to be preserved within visible areas of the partition 10. Consequently, after a database failure, only the space allocated for the hidden third area 16 and the index 60' has to be released (deallocated) again. This is preferably performed during a restart of the database system.

As explained further above, the transaction log 50 only comprises a simple pointer to a (preferably compressed) data structure 40 identifying the data records 20 to be deleted. A 'redo' process may therefore simply call the mass delete procedure with the identifiers obtained from the data structure 40 as input.

In an alternative embodiment of the present invention, the steps of the mass delete procedure to be performed after the determination of the data records 20 to be deleted in step 120 are only performed, if the number of data records 20 to be deleted exceeds a reasonable predetermined border. Otherwise, the known transactional mass delete may be performed.

In summary, the aspects of the present invention described above provide a transactional mass delete which does not corrupt the data of the database system, does not overload the transaction log and in addition grants read access to the already present data in the partition for further transactions running in parallel to the mass delete transaction. In other words, the data of the affected partition(s) can still be accessed while a fail-save and particularly fast mass delete is in progress.

It will be appreciated that the database system 1 may include any suitable combination of programmed logic circuitry (e.g., hardware, software, firmware, and/or the like). For example, the database system 1 may include a processor that helps execute instructions and/or commands. In certain example embodiments, the data records 20, data structure 40, transaction log 50, existing index 60, new index 60' etc., may be stored in a suitable storage location (such as, for example, one or more databases, files, or other tangible memory locations). It will be appreciated that certain example embodiments may comprise a computer readable storage medium storing tangible instructions that, when executed by a processor (e.g., of the database system 1), perform the above-described method steps. It also will be appreciated that the example methods disclosed herein may be executed, in whole or in part, by the database system 1 and/or a processor thereof.

The invention claimed is:

1. A method of mass deleting a plurality of data records stored in a database system that includes a non-transitory storage medium and a processing system that includes at least one processor, the method comprising:
   maintaining a transaction log of the database system that is configured to hold a history of transactions performed against the database system;
   receiving a mass delete instruction for the plurality of data records;
   creating a deletion data structure;
   storing the deletion data structure to the non-transitory storage medium;
   determining a plurality of record identifiers that indicate the plurality of data records to be deleted;
   inserting, responsive to the received mass delete instruction, the determined plurality of record identifiers into the deletion data structure;
   inserting, via the processing system, a record into the maintained transaction log based at least in part on the received mass delete instruction, the record including of a pointer to the stored deletion data structure; and
   deleting, via the processing system, the plurality of data records in accordance with the received mass delete instruction.

2. The method of claim 1, wherein the database system further includes at least one partition and the plurality of data records is located within the at least one partition and the method further comprises:
   determining if the number of the plurality of data records is less than a threshold value;
   when the number of the plurality of data records is less than a threshold value:
      moving the plurality of data records from a first area of the at least one partition to a second area of the at least one partition; and
      receiving a COMMIT command; and
      de-allocating the second area of the at least one partition responsive to receipt of the COMMIT command.

3. The method of claim 2, wherein the second area of the at least one partition is visible during a processing of at least one further database request.

4. The method of claim 1, wherein the database system further includes at least one partition and the plurality of data records is located within the at least one partition and the at least one partition comprises at least one further data record, and wherein the method further comprises:
   determining if a number of data records in the plurality of data records is greater than or equal to a predetermined threshold,
   when the number of data records is greater than or equal to a predetermined threshold:
      copying the at least one further data record from a first area of the at least one partition to a hidden third area of the at least one partition;
      receiving a COMMIT command;
      setting the hidden third area of the at least one partition to visible in accordance with reception of the COMMIT command; and
      de-allocating the first area of the at least one partition in accordance with reception of the COMMIT command.

5. The method of claim 4, further comprising:
   receiving a ROLLBACK command; and
   de-allocating the hidden third area of the at least one partition in accordance with the received ROLLBACK command.

6. The method of claim 1, wherein the database system includes at least one existing index that is based on the plurality of data records and at least one further data record, where the method further comprises:
   generating at least one new index based only on the at least one further data record; and
   receiving a COMMIT command;
   replacing the at least one existing index with the at least one new index.

7. The method of claim 6, further comprising:
   receiving a ROLLBACK command; and
   de-allocating the at least one new index.

8. The method of claim 1, further comprising:
   write-locking at least one partition that comprises the plurality of data records, wherein the write-locked at least one partition allows read access prior to any modification of the at least one partition; and
   unlocking the at least one partition after the plurality of data records is deleted.

9. The method of claim 1, wherein the deletion data structure is a bitmap file.

10. The method of claim 1, further comprising processing at least one database query to obtain the plurality of record identifiers.

11. The method of claim 1, wherein the database system includes a plurality of partitions and the plurality of data records are distributed among the plurality of partitions.

12. The method of claim 1, further comprising:
receiving a REDO command;
looking up the pointer to the deletion data structure within the transaction log of the database system; and
deleting, via the processing system, at least one data record from the database based on record identifiers within the deletion data structure.

13. A database system comprising:
a non-transitory storage medium configured to store:
a plurality of data records; and
a transaction log of the database system that is configured to hold a history of each transaction performed against the database system; and
a processing system that includes at least one processor, the processing system configured to:
update the transaction log in accordance with operations performed against the database system;
receive a mass delete instruction for deleting the plurality of data records;
create a deletion data structure;
store the deletion data structure to the non-transitory storage medium;
determine a plurality record identifiers that correspond to the plurality of data records to be deleted;
insert, responsive to the received mass delete instruction, the plurality of record identifiers into the deletion data structure;
delete each one of the plurality of data records in accordance with the received mass delete instruction; and
insert a first record into the maintained transaction log based at least in part on the deletion of the plurality of data records, the first record including of a pointer to the stored deletion data structure.

14. The database system of claim 13, wherein the non-transitory storage medium is configured to include at least one partition and the plurality of data records is located within the at least one partition, and wherein the processing system is further configured to:
determine if a number of the plurality of data records is less than a threshold value;
when the number of the plurality of data records is less than a threshold value:
move the plurality of data records from a first area of the at least one partition to a second area of the at least one partition; and
receive a COMMIT command; and
de-allocate the second area of the at least one partition responsive to the received COMMIT command.

15. The database system of claim 13, wherein the non-transitory storage medium is configured to include at least one partition and the plurality of data records is located within the at least one partition that includes at least one further data record,
wherein the processing system is further configured to:
determine if a number of data records in the plurality of data records is greater than or equal to a predetermined threshold,
when the number of data records is greater than or equal to a predetermined threshold:
copy the at least one further data record from a first area of the at least one partition to a hidden third area of the at least one partition;
receive a COMMIT command;
set the hidden third area of the at least one partition to visible in accordance with reception of the COMMIT command; and
de-allocate the first area of the at least one partition in accordance with reception of the COMMIT command.

16. The database system of claim 15, wherein the processing system is further configure to:
receive a ROLLBACK command; and
de-allocate the hidden third area of the at least one partition in accordance with the received ROLLBACK command.

17. The database system of claim 13, wherein the processing system is further configured to:
manage at least one existing index that is based on the plurality of data records and at least one further data record;
generate at least one new index based only on the at least one further data record;
receive a COMMIT command; and
replace the at least one existing index with the at least one new index in accordance with the receive COMMIT command.

18. A non-transitory storage medium comprising computer readable instructions for use with a database system for performing a mass deletion of a plurality of data records that are stored in a non-transitory storage medium of the database system, the stored computer readable instructions comprising instructions configured to:
maintain a transaction log of the database system that is configured to hold a history of each transaction performed against the database system;
receive a mass delete instruction instructing the database system to delete the plurality of data records from the database system;
create a deletion data structure;
store the deletion data structure to the non-transitory storage medium;
determine a plurality of record identifiers that indicate the plurality of data records to be deleted;
insert, responsive to the received mass delete instruction, the plurality of record identifiers into the deletion data structure;
delete at least a first data record of the plurality of data records in accordance with the received mass delete instruction; and
insert a first record into the maintained transaction log based at least in part on the deletion of at least the first data record, the first record including of a pointer to the stored deletion data structure.

19. The medium of claim 18, wherein the non-transitory storage medium includes at least one partition in which the plurality of data records are stored, the at least one partition further including at least one further data record, and wherein the instructions are further configured to:
determine if a number of data records in the plurality of data records is greater than or equal to a predetermined threshold,
when the number of data records is greater than or equal to the predetermined threshold:
copy the at least one further data record from a first area of the at least one partition to a hidden third area of the at least one partition;
receive a COMMIT command;
set the hidden third area of the at least one partition to visible in accordance with reception of the COMMIT command; and de-allocate the first area of the at least one partition in accordance with reception of the COMMIT command.

20. The method of claim 1, wherein the record consists of the pointer to the stored deletion data structure.

21. The method of claim 1, wherein the mass delete instruction is associated with a transaction performed by the database system and the transaction history of the mass delete instruction in the transaction log comprises the inserted record.

22. The system of claim 13, wherein the mass delete instruction is associated with a transaction performed by the processing system, and the transaction history of the mass delete instruction in the transaction log comprises the inserted record,
   wherein the processing system, in accordance with the transaction, is further configured to:
      ensure that the transaction is atomic;
      ensure that execution of the transaction will maintain consistency in the database system;
      ensure isolation of affected records such that no other transaction can affect the transaction; and
      ensure durability of the database system in accordance with performance of the transaction.

23. The system of claim 18, wherein the mass delete instruction is associated with a transaction that is performed with ACID properties by the database system, and the transaction history of the mass delete instruction in the transaction log comprises the inserted record.

24. The method of claim 1, wherein the plurality of record identifiers includes a range of identifiers that indicate data records within the range.

* * * * *